United States Patent
He et al.

(10) Patent No.: US 10,319,326 B2
(45) Date of Patent: Jun. 11, 2019

(54) DISPLAY CONTROLLER AND DISPLAY DEVICE

(71) Applicant: Shenzhen China Star Optoelectronics Technology Co., Ltd., Shenzhen, Guangdong (CN)

(72) Inventors: Jhenwei He, Guangdong (CN); Yu-Yeh Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 268 days.

(21) Appl. No.: 15/033,649

(22) PCT Filed: Jan. 28, 2016

(86) PCT No.: PCT/CN2016/072423
§ 371 (c)(1),
(2) Date: May 1, 2016

(87) PCT Pub. No.: WO2017/113466
PCT Pub. Date: Jul. 6, 2017

(65) Prior Publication Data
US 2018/0096665 A1    Apr. 5, 2018

(30) Foreign Application Priority Data
Dec. 31, 2015 (CN) .......................... 2015 1 1028650

(51) Int. Cl.
*G09G 3/36* (2006.01)
*G02F 1/133* (2006.01)
(Continued)

(52) U.S. Cl.
CPC .......... *G09G 3/3685* (2013.01); *G02F 1/133* (2013.01); *G09G 3/2096* (2013.01); *G09G 5/18* (2013.01);
(Continued)

(58) Field of Classification Search
CPC .............................. G09G 3/3685; G02F 1/133
See application file for complete search history.

(56) References Cited

U.S. PATENT DOCUMENTS 9,318,069 B2 * 4/2016 Nambi ..................... G09G 3/36
9,472,135 B2 * 10/2016 Wen ..................... G09G 3/2025
(Continued)

FOREIGN PATENT DOCUMENTS

CN           1866349 A      11/2006
CN         101038732 A       9/2007
(Continued)

*Primary Examiner* — Afroza Chowdhury
(74) *Attorney, Agent, or Firm* — Andrew C. Cheng

(57) ABSTRACT

This disclosure provides a display controller. The controller includes a timing controlling unit for providing a signal, a buffer unit for storing image information and outputting the image information processed with certain algorithm, a power management unit for managing the power of the display controller; and a data driving unit for providing a signal to a data line of a display device and controlling the image which is displayed. The timing controlling unit is electrically connected to the buffer unit. The buffer unit and the power management unit are integrated in a first circuit, and The timing controller and the data driving unit are integrated in a second circuit. The cost of the controller in thin disclosure is reduced. This disclosure also provides a display device with the above-mentioned display controller.

10 Claims, 2 Drawing Sheets

(51) Int. Cl.
*G09G 3/20* (2006.01)
*G09G 5/18* (2006.01)
(52) U.S. Cl.
CPC . *G09G 2340/02* (2013.01); *G09G 2340/0435* (2013.01); *G09G 2370/08* (2013.01)

(56) References Cited

U.S. PATENT DOCUMENTS

| | | |
|---|---|---|
| 2006/0232579 A1 | 10/2006 | Chen et al. |
| 2008/0100550 A1* | 5/2008 | Lee ............... G09G 3/3648 345/87 |
| 2012/0188224 A1* | 7/2012 | Lee ............... G09G 3/20 345/214 |
| 2013/0002621 A1 | 1/2013 | Chen et al. |
| 2014/0198138 A1* | 7/2014 | Nambi ............ G09G 3/36 345/690 |
| 2014/0217474 A1* | 8/2014 | Lee ............... H01L 27/14605 257/225 |
| 2015/0248865 A1* | 9/2015 | Lim ............... G09G 3/3696 345/691 |

FOREIGN PATENT DOCUMENTS

| | | |
|---|---|---|
| CN | 102110404 A | 6/2011 |
| CN | 102314854 A | 1/2012 |
| CN | 102394043 A | 3/2012 |
| CN | 103680432 A | 3/2014 |
| CN | 105448223 A | 3/2016 |
| TW | 200811787 A | 3/2008 |

* cited by examiner

DISPLAY CONTROLLER AND DISPLAY DEVICE

CROSS REFERENCE

This application claims the priority of Chinese Patent Application No. 201511028650.8, entitled "Display controller and display device", filed on Dec. 31, 2015, the disclosure of which is incorporated herein by reference in its entirety.

FIELD OF THE INVENTION

This disclosure is related to display control technology, especially related to the display controller and the display device

BACKGROUND OF THE INVENTION

The timing controlling unit is generally used in the display controller. In the controller, the buffer unit is necessary. For example, while Over Drive (OD) technology is applied, the frame buffer is required. The conventional buffer unit is integrated with the timing controlling unit while packing process. In other words, the timing controlling unit and the buffer unit are fabricated individually and integrated while packaging. The package process is complicated and the cost is high as well. With the upcoming high definition resolution technology, the resolution of the image is higher and higher and the buffer unit needs to process more and more data with certain algorithm. Therefore, the cost of the buffer unit is higher as well. Meanwhile, the timing controlling unit, the buffer unit, the power management unit and other functional unit are disposed on one circuit board in the conventional controller. The size of the circuit board is larger and requires a specific space to dispose in the display device. This makes the display device big, heavy and high cost.

SUMMARY OF THE INVENTION

To solve the issues mentioned above, this disclosure provides a low cost display controller and a display device.

In one embodiment of the present disclosure, a display controller is provided. The display controller comprises a timing controlling unit for providing a signal, a buffer unit for storing image information and outputting the image information processed with certain algorithm, a power management unit for managing the power of the display controller; and a data driving unit for providing a signal to a data line of a display device and controlling the image which is displayed. The timing controlling unit is electrically connected to the buffer unit. The buffer unit and the power management unit are integrated in a first circuit, and The timing controller and the data driving unit are integrated in a second circuit.

In this embodiment, the timing controlling unit communicates data signal to the buffer unit.

In this embodiment, the timing controlling unit further comprises a data processing module for compression coding and decoding of the signal.

In this embodiment, the data processing module is electrically connected to the buffer unit.

In this embodiment, lines between the timing controlling unit and the buffer unit are less than pins of the buffer unit.

In this embodiment, the buffer unit is a Double Data Rate SDRAM or a flash memory.

This disclosure also provides another embodiment of a display device with the above-mentioned display controller. The display controller is connected to the display panel and controls the image which is going to be displayed on the display panel.

To compare with the conventional technology, the embodiments of the present disclosure has several advantages listed as below:

In the embodiments of the present disclosure, the timing controlling unit is not integrated with the buffer unit while the package process. Instead, the timing controlling unit is integrated with the power management unit while fabricating. This makes the timing controlling unit and the power management unit be integrated on the same circuit. Therefore, the cost of packaging the timing controlling unit is reduced. The cost of the display controller is also reduced while achieving the high definition resolution requirement.

In the meantime, since the timing controlling unit and the buffer unit are integrated with the power management unit and the data driving unit respectively to form a compact first circuit and a compact second circuit, the carrier substrate of such circuits is no more required. This lowers the manufacturing cost and the first circuit and the second circuit can be disposed at any locations in the display device. This increase the flexibility of the layout design of the display device. Therefore, the display device can be compact and low-cost.

BRIEF DESCRIPTION OF THE DRAWINGS

The disclosure is best understood from the following detailed description when read in connection with the accompanying drawings, which illustrate an embodiment of the present disclosure.

DETAILED DESCRIPTION OF PREFERRED EMBODIMENTS

The present disclosure will now be described more specifically with reference to the following embodiments. It is to be noted that the following descriptions of embodiments are presented herein for purpose of illustration and description only. It is not intended to be exhaustive or to be limited to the precise form disclosed.

Figure 1:
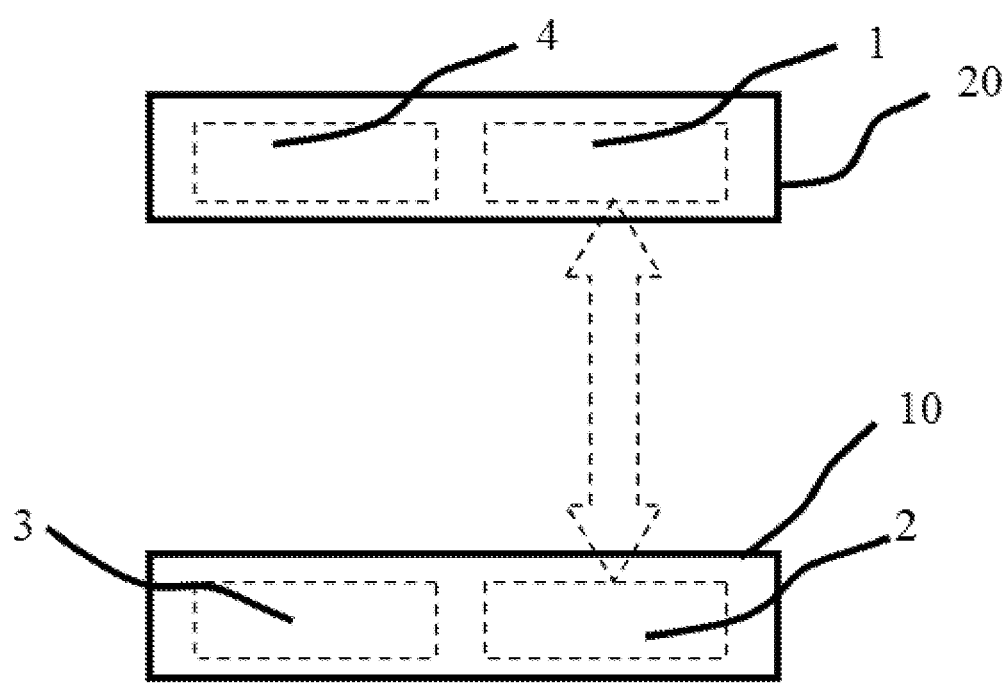
FIG. 1 is the schematic diagram of the display controller in one embodiment of the present disclosure.

With reference to FIG. 1, this embedment provides a display controller. The controller comprises a timing controlling unit 1, a buffer unit 2, a power management unit 3; and a data driving unit 4. The timing controlling unit 1 provide at least a signal. The buffer unit 2 functions for storing image information and outputting the image information which is processed with certain algorithm. The power management unit 3 manages the power of the display controller. The data driving unit 4 provides a signal to a data line of a display device and controlling the image which is displayed. The timing controlling unit 1 is electrically connected to the buffer unit 2 (the dash line illustrated the electrical connection in FIG. 1). The buffer unit and the power management unit are integrated in a first circuit 10, and the timing controller and the data driving unit are integrated in a second circuit 20.

In the embodiments of the present disclosure, the timing controlling unit 1 is not integrated with the buffer unit 2 while the package process. Instead, the timing controlling unit 1 is integrated with the power management unit 3 while fabricating. The buffer unit 2 and the power management unit 3 are integrated in the first circuit 10. Therefore, the cost of packaging the timing controlling unit 1 is reduced. The cost of the display controller is also reduced while achieving the high definition resolution requirement. In the meantime, since the first circuit 10 is compact in size, the carrier circuit board is not required anymore. The first circuit 10 can be located at any space in the display device to increase the layout design flexibility to reduce the size of the display device and the manufacturing cost.

Moreover, the timing controlling unit 1 and the data driving unit 4 are integrated in the second circuit 20. Since the second circuit 20 is compact in size, the carrier circuit board is not required anymore. The second circuit 20 can be located at any space in the display device to increase the layout design flexibility to reduce the size of the display device and the manufacturing cost.

In some embodiments of the present disclosure, the timing controlling unit 1 further comprises a data processing module for compression coding and decoding of the signal. The data processing module is electrically connected to the buffer unit 2. The signal is encoded for compression to form the image information by data processing module. The image information is stored in the buffer unit 2. The image information stored in the buffer unit 2 can be read out and outputted to the data processing module to be processed with certain algorithm for the compression decoding.

Figure 2:
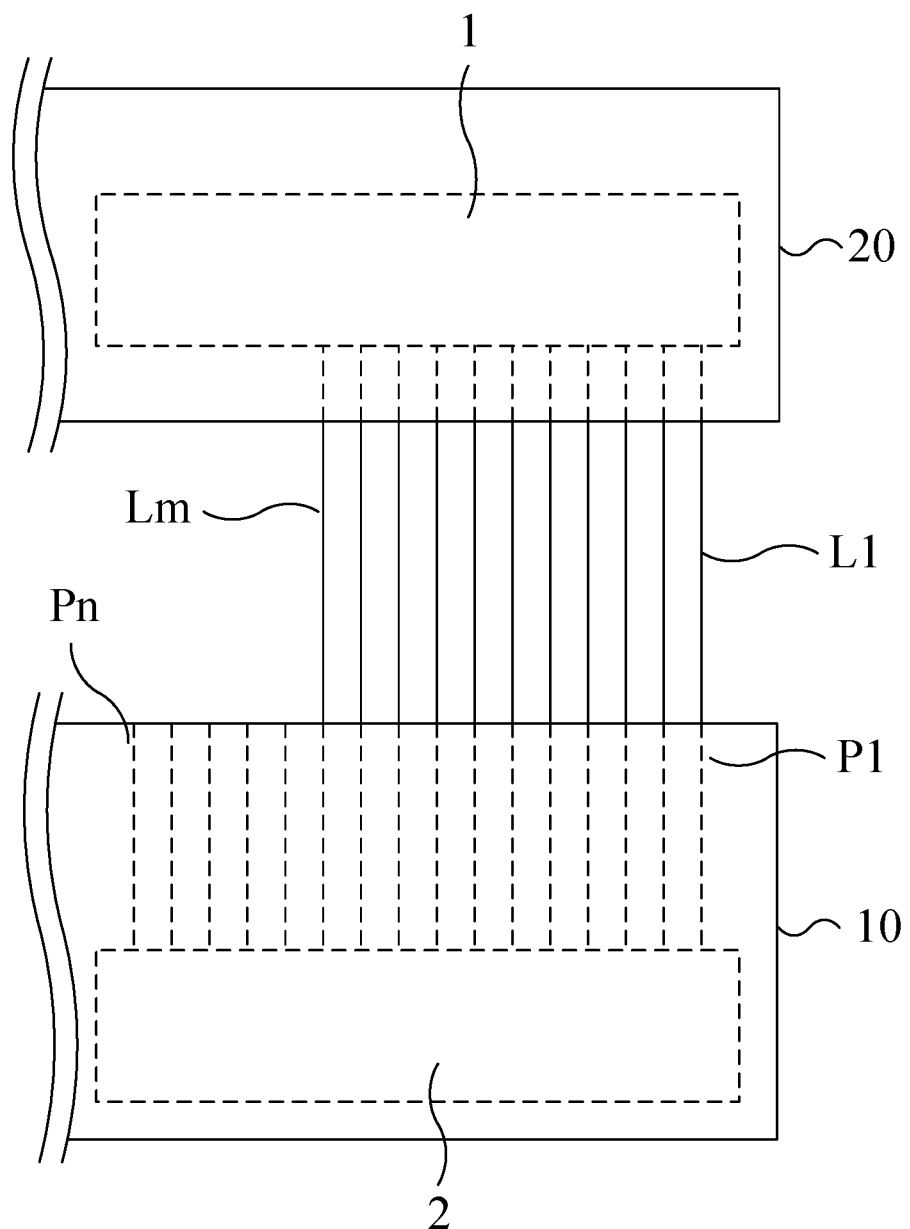
FIG. 2 is the schematic diagram of the connection relationship between the timing controlling unit and the buffer unit in one embodiment of the present disclosure.

To be specific, lines between the timing controlling unit 1 and the buffer unit 2 are less than pins of the buffer unit 2. While the information is compressed before transmitting between the timing controlling unit 1 and the buffer unit 2, the lines in between can be reduced accordingly. The number of lines between the time unit 1 and the buffer unit should be design for the capability of image information transmission. Please refer to FIG. 2, the buffer unit 2 in this embodiment comprises pins P1~Pn, and the lines L1~Lm are connected between the timing controlling unit 1 and the buffer unit 2 and are connected to part of the pins P1~Pn of the buffer unit 2, wherein m is less than n.

For example, while the buffer unit 2 is a 16-bit buffer unit, this indicates each the storage location can store 16 bits data. 16 data lines are required while reading out the information in each storage location. (the transmission of each data line is 1 bit.) When the transmission frequency of the buffer unit 2 is 300 MHz, the buffer unit 2 can read out 2400M bits data (300M*16 bits). For the high definition resolution, the transmission data per second is around 1500M bits (1366*768*24*60). According to this, at least 11 data lines are required for the buffer unit 2 to process the high definition resolution signal (16*1500/2400). Therefore, the amount of data line can be reduced to 11.

If the data is compressed accordingly, the amount of data line can be reduced as well. For example, if the data is compressed to ½, the data size is reduced to 8 bits (16 bits/2) even the capacity of the storage location is not change. Therefore, the amount of data line can be reduced to 6. (11*½) Similarly, if the compressing ratio is ¼, the amount of the data line can be reduced to 3. (11*¼).

In the present embodiment, the amount of the data line between the timing controlling unit 1 and the buffer unit 2 is strictly controlled. Only the minimum amount of data line is kept according to the data transmission amount. When the amount of data line is reduced, the layout of the display controller is simplified, and the cost of the display controller can be lower.

In the present embodiment, the buffer unit 2 can be a Double Data Rate SDRAM or a flash. In a preferred embodiment, the buffer unit is a Double Data Rate SDRAM. Due to the advanced synchronizing circuit in the Double Data Rate SDRAM, the major steps of the address allocation, data transmission, and data outputting can be operated individually and keep synchronizing with CPU.

This disclosure also provides another embodiment of a display device with the above-mentioned display controller. The display controller is connected to the display panel and controls the image which is going to be displayed on the display panel.

since the timing controlling unit and the buffer unit are integrated with the power management unit and the data driving unit respectively to form a compact first circuit and a compact second circuit, the carrier substrate of such circuits is no more required. This lowers the manufacturing cost and the first circuit and the second circuit can be disposed at any locations in the display device. This increase the flexibility of the layout design of the display device. Therefore, the display device can be compact and low-cost.

Although the description above contains many specificities, these should not be construed as limiting the scope of the embodiment but as merely providing illustrations of some of the presently preferred embodiments. Rather, the scope of the disclosure is to be determined only by the appended claims and their equivalents.

What is claimed is:

1. A display controller, comprising:
    a timing controlling unit for providing a signal;
    a buffer unit for storing image information and outputting the image information processed with certain algorithm;
    a power management unit for managing the power of the display controller; and
    a data driving unit for providing a signal to a data line of a display device and controlling the image which is displayed, wherein
    the timing controlling unit is electrically connected to the buffer unit, the buffer unit and the power management unit are integrated in a first circuit, and the timing controlling unit and the data driving unit are integrated in a second circuit,
    wherein, the buffer unit comprises a plurality of pins configured for connecting to the timing controlling unit, a plurality of lines are connected between the pins of the buffer unit and the timing controlling unit, and a number of the lines is less than a number of the pins configured for connecting to the timing controlling unit such that at least one of the pins configured for connecting to the timing controlling unit is floated.

2. The display controller according to claim 1, wherein the timing controlling unit communicates data signal to the buffer unit.

3. The display controller according to claim 1, wherein the timing controlling unit further comprises a data processing module for compression coding and decoding of the signal.

4. The display controller according to claim 3, wherein the data processing module is electrically connected to the buffer unit.

5. The display controller according to claim 1, wherein the buffer unit is a Double Data Rate SDRAM or a flash memory.

6. A display device, comprising a display controller and a display panel, wherein the display controller comprises:
    a timing controlling unit, for providing at least a signal;

a buffer unit for storing image information and outputting the image information processed with certain algorithm;

a power management unit for managing the power of the display controller; and a data driving unit for providing a signal to a data line of a display device and controlling the image which is displayed, wherein the timing controlling unit is electrically connected to the buffer unit, the buffer unit and the power management unit are integrated in a first circuit, and the timing controlling unit and the data driving unit are integrated in a second circuit, wherein, the buffer unit comprises a plurality of pins configured for connecting to the timing controlling unit, a plurality of lines are connected between the pins of the buffer unit and the timing controlling unit, and a number of the lines is less than a number of the pins configured for connecting to the timing controlling unit such that at least one of the pins configured for connecting to the timing controlling unit is floated.

7. The display controller according to claim 6, wherein the timing controlling unit communicates data signal to the buffer unit.

8. The display controller according to claim 6, wherein the timing controlling unit further comprises a data processing module for compression coding and decoding of the signal.

9. The display controller according to claim 8, wherein the data processing module is electrically connected to the buffer unit.

10. The display controller according to claim 6, wherein the buffer unit is a Double Data Rate SDRAM or a flash memory.

* * * * *